May 25, 1937.    R. R. BLOSS ET AL    2,081,141
COUNTERBALANCING DEVICE
Filed April 14, 1928    3 Sheets-Sheet 1
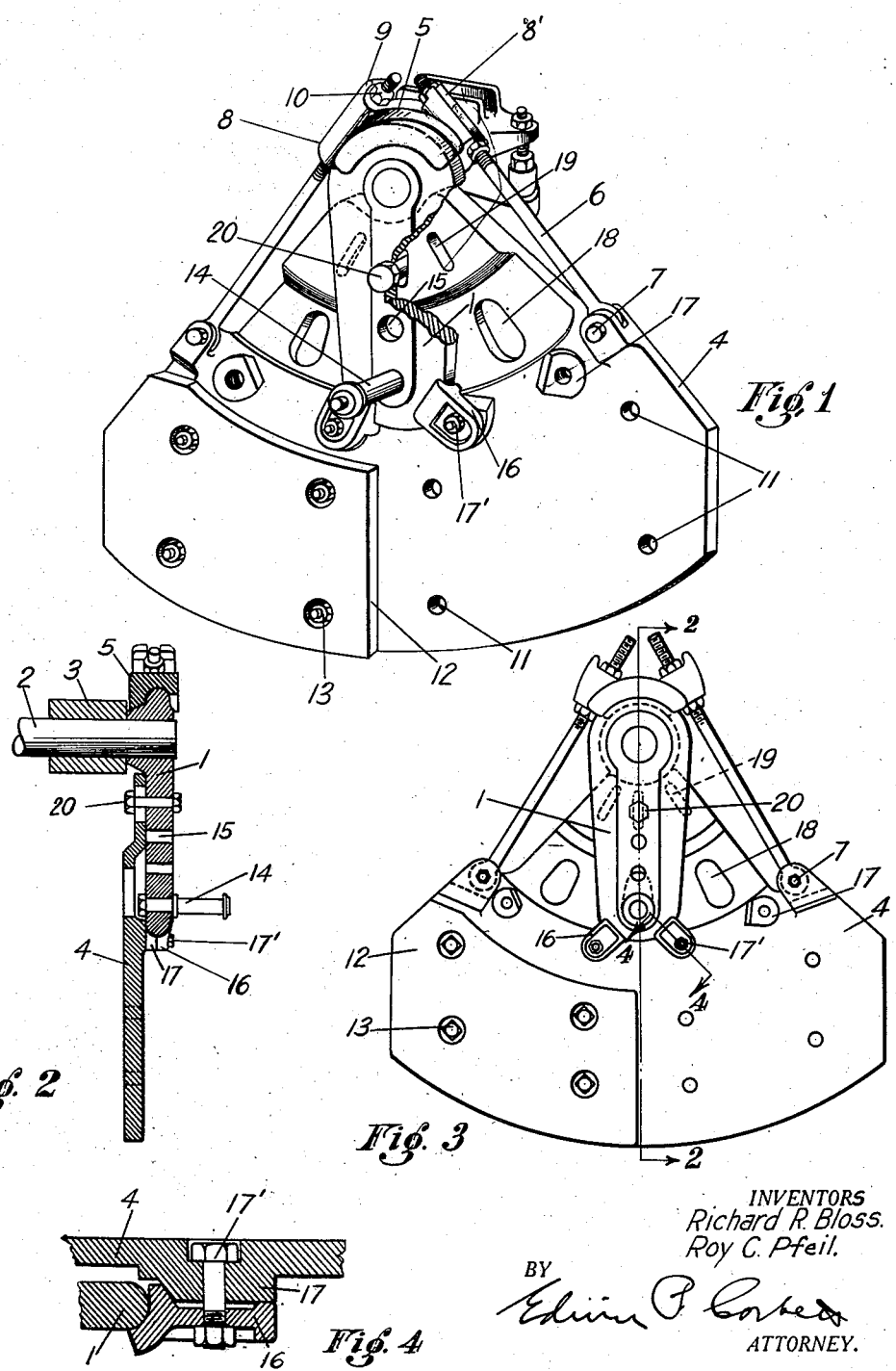
INVENTORS
Richard R. Bloss.
Roy C. Pfeil.
BY
Edwin P. Corbett
ATTORNEY.

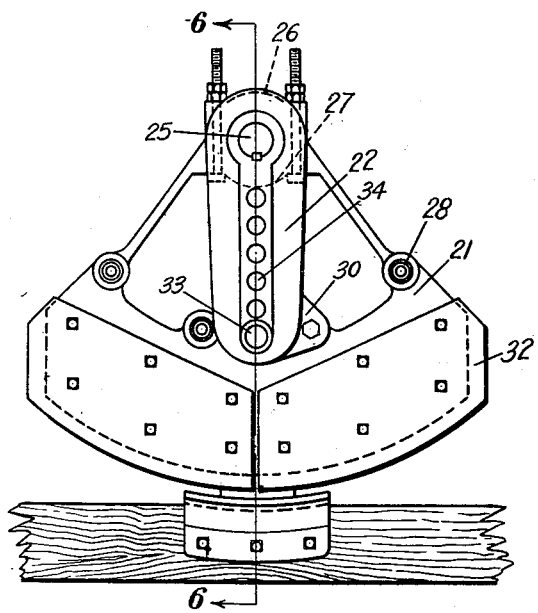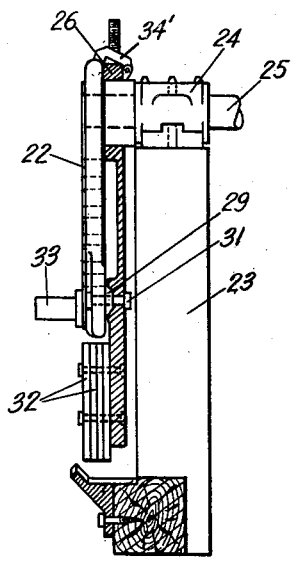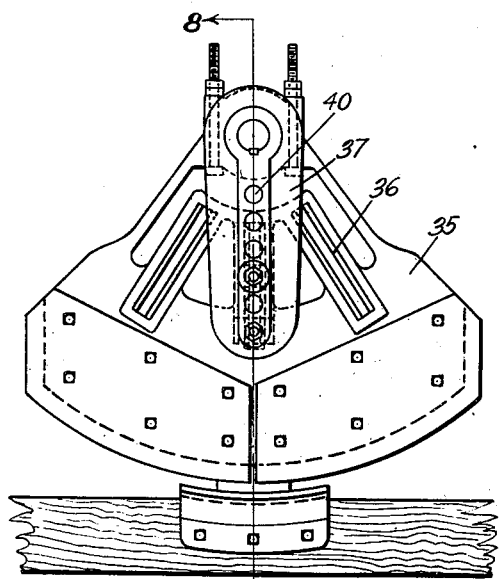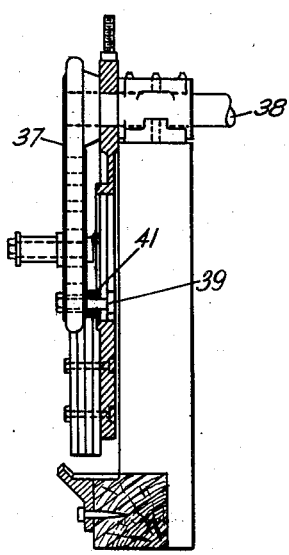

May 25, 1937.   R. R. BLOSS ET AL   2,081,141
COUNTERBALANCING DEVICE
Filed April 14, 1928   3 Sheets-Sheet 3

INVENTORS
Richard R. Bloss.
Roy C. Pfeil.
BY
ATTORNEY

Patented May 25, 1937

2,081,141

UNITED STATES PATENT OFFICE 2,081,141

COUNTERBALANCING DEVICE

Richard R. Bloss and Roy C. Pfeil, Columbus, Ohio, assignors to The International Derrick & Equipment Company, Columbus, Ohio, a corporation of Ohio Application April 14, 1928, Serial No. 270,071

8 Claims. (Cl. 74—591)

Our invention relates to a counterbalancing device. It relates particularly to a counterbalancing device that is attached to and operated in conjunction with the crank of an oil well drilling and pumping mechanism.

Previous counterbalances, in most instances, have been attached to and have operated in conjunction with either the band wheel or walking beam and such counterbalances have not been entirely satisfactory for various reasons. It is one object of this invention not only to provide a counterbalance which is adapted to be attached to and operate in conjunction with the crank of an oil well drilling and pumping mechanism but to provide a counterbalance which is so designed and constructed as to be adapted to any standard make of crank which may already be in use in the field.

Some advantages of a counterbalance which is so designed as to be attached to and operate with the crank reside in the fact that the wear and tear on the band wheel and walking beam and the torsional stress on the crankshaft, as produced by ordinary types of band wheel or walking beam counterbalances, are eliminated. With our design and construction, we avoid unusual stress on any part of the drilling and pumping mechanism with the exception of the crank arm itself.

Other advantages of our invention reside in the fact that our counterbalance is located outside of the rig house whereby it may be readily adjusted and operated. It is so constructed that it may be easily shifted in an arcuate path with relation to the crank arm so as to synchronize the counterbalance effect with the load.

In our invention, features of adjustability have been provided in order to meet the variations in weight of the suspended pumping and drilling mechanism and the oil or other fluid above the plunger. Also, we have provided features of adjustability which will enable us to synchronize the counterbalance effect with the sucker rod pull.

This application is a continuation in part of our applications respectively filed February 14, 1927, Serial No. 167,924, and October 26, 1927, Serial No. 228,963.

Other advantageous features will appear from the following detailed description and the preferred embodiment of our invention may be seen in the accompanying drawings wherein similar characters of reference designate corresponding parts and wherein:

Figure 1 is a perspective view of the preferred embodiment of our invention and showing it mounted upon a crank.

Figure 2 is a sectional view taken on the line 2—2 of Figure 3.

Figure 3 is a front elevation of the structure shown in Figure 1.

Figure 4 is a sectional view taken on the line 4—4 of Figure 3.

Figure 5 is a front elevation of a modified form of our invention.

Figure 6 is a side view, partly in section, of the device shown in Figure 5.

Figure 7 is a front elevation of another modified form of our invention.

Figure 8 is a side view, partly in section, of the device shown in Figure 7.

Figure 9:
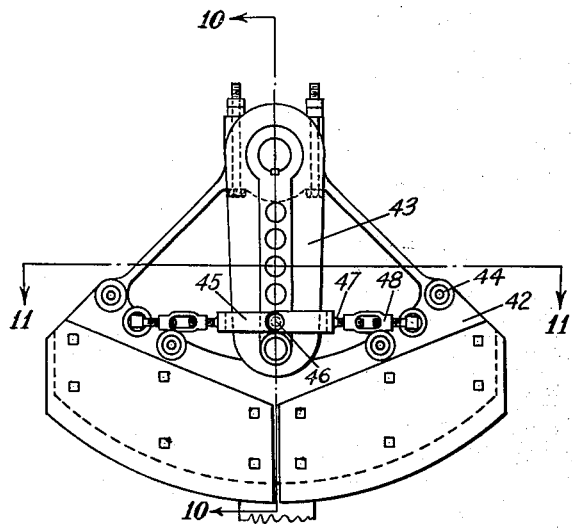
Figure 9 is a front elevation of still another modified form of our invention.

Referring to the drawings, we have shown a crank 1, which may be of any standard make, mounted on and keyed to a crankshaft 2. The crankshaft 2 operates in a bearing 3 that may be supported by a jack-post or a similar supporting structure. A counterbalance unit 4 is suspended from the hub of the crank 1 by means of a cap 5, as shown in Figure 2, which cap straddles the top of the crank 1 to prevent movement of the counterbalance unit along the crankshaft 2 and relative to the crank. The upper part of the crank acts as a shoulder which fits in a socket in the cap 5.

We have provided means for drawing the main body portion of the counterbalance unit 4 towards the cap 5 or releasing the main body portion so that it may be moved away from the cap. This is accomplished by providing rods 6, whose outer ends are attached by clevises to the main body portion of the counterbalance unit as shown at 7 in Figures 1 and 3.

The cap 5 is provided with tubular housings 8 and one of these housings has a longitudinal cutaway portion or slot 8'. The rods 6 may be moved into cooperative relation with the cap 5 by inserting one of the rods endwise into one hollow tubular portion 8 of the cap 5 and through the slot 8' of the other. Lugs 9 may be provided on the cap 5 to prevent the rods from easily becoming disengaged therefrom. It will be apparent that, by tightening the nuts 10 on the rods 6, the main body portion of the counterbalance unit may be moved towards the hub of the crank 1, and that by loosening these nuts it may be allowed to move away from the said hub.

In the lower part of the counterbalance unit 4 we have provided a plurality of holes 11 as a means whereby supplemental weight elements 12 may be attached to or detached from the counterbalance unit. These supplemental weight elements 12 may be attached to the counterbalance unit in any desired number by means of bolts 13. It will be understood that pitman of any preferred form may be attached to the crank 1 by means of the wrist pin 14. A plurality of holes 15 are provided in the crank 1 to permit adjustment of the wrist pin to different positions along the length of the crank and for other reasons hereinafter described.

The counterbalance unit 4 is provided with a plurality of lugs 16 that are movable on bases 17 which are disposed in an arcuate path on the surface of the counterbalance unit and held on the counterbalance unit by bolts 17'. These lugs provide a means for adjusting the weight center of the counterbalance unit to a multiplicity of positions with respect to the crank arm 1. Such counterbalance unit is also provided with openings 18 which are adapted to receive one end of the wrist pin 14 and with slots 19 which are adapted to receive a bolt 20 that extends through the crank 1 and the counterbalance unit.

In the assembling of our device, the counterbalance unit is placed in a position with relation to the crank 1 whereby the cap 5 may be placed over the crank hub and the top of the crank 1. At this time one of the rods 6 is already in position in its tubular housing 8 and the other of these rods 6 is thereupon moved into cooperative relation with the cap 5 by way of the slot 8'. The lugs 16 are then moved to a position proximating to the ones shown in Figures 1 and 3 wherein the lower end of the crank 1 is positioned between two of the lugs 16. At this time, the nuts 10 on the rods 6 are tightened to draw the main body portion of the counterbalance unit upwardly until the crank 1 is wedged tightly between the lugs 16 and the cap 5. Then, the bolt 20 is inserted through one of the wrist pin holes 15 of the crank and then through one of the slots 19 in the counterbalance unit. Our device may be disassembled from the crank by reversing the order of operations hereinbefore set out.

In Figures 5 to 13 inclusive, we have shown various modifications of our invention. For instance, in Figures 5 and 6 we have shown one modified form of our invention in which a counterbalance unit 21 is preferably mounted on the hub of a crank arm 22 that has been machined slightly.

This counterbalance unit 21 is mounted between the crank arm 22 and the jack-post or similar supporting structure 23 on which a bearing 24 is mounted as a means for supporting a crank-shaft 25. A semi-circular clamp 26 cooperates with a semi-circular recessed portion 27 in the counterbalance unit to hold the counterbalance unit on the hub of the crank 22. The counterbalance unit is provided with a plurality of tapered sockets 28 which are designed to cooperate with a tapered boss 29 mounted on a plate 30 that extends laterally from the crank 22. Such plate 30 may be welded or otherwise attached to any standard type of crank and may extend from the crank at any desired location.

The tapered boss and tapered sockets provide a means for adjusting the weight center of the counterbalance unit to a multiplicity of positions with respect to the crank arm 22 and a bolt 31 is provided for holding the crank arm 22 and the counterbalance unit 21 in their respective adjusted positions. When the crank arm and counterbalance unit are in cooperative relation, the bolt 31 extends through the tapered boss 29 and through holes in the base of the tapered socket 28.

As in the preferred form of our invention, we have provided a plurality of bolt holes in the lower part of the counterbalance unit 21 as a means whereby supplemental weight elements 32 may be attached to or detached from the counterbalance unit as desired. A wrist pin 33 is also provided as a means whereby a pitman may be attached to the crank arm and a plurality of holes 34 are provided in the crank arm to permit adjustment of the wrist pin to different positions along the length thereof.

It will be apparent that the counterbalance unit 21 may be readily attached to or detached from the crank arm. In order to attach the counterbalance unit to the crank arm it is only necessary to mount the unit on the hub of the crank and then insert the bolt 31 through the tapered boss 29 and through the hole in the base of one of the tapered sockets 28. The counterbalance unit may be easily detached from the crank arm by reversing the order of operations just described.

Referring to Figures 5 and 6 of the drawings, it will be seen that the counterbalance weight structure is movable along the hub of the crank arm either toward or from the inner face of this crank arm. In order that the counterbalance weight structure may be effectively maintained in such spaced relation to the crank arm that the crank arm will be free to move in a rotary path without interference from the counterbalance weight structure, we have provided a pivoted latch 34' which is normally ineffective when the counterweight structure is operatively connected to the crank arm. This pivoted latch may be swung downwardly to such extent that one end thereof will be between the semi-circular clamp 26 of the counterweight structure and the crank 22 to hold the counterweight structure in spaced relation to the crank arm.

Referring to Figures 7 and 8 of the drawings, we have shown another modified form of our invention which consists of a counterweight structure 35 that is of substantially the same construction as the counterweight structure shown in Figures 5 and 6, with the exception that the counterweight structure 35 is mounted on the crankshaft 38 and is provided with a plurality of radial slots 36. To attach the counterweight structure shown in these figures to the crank arm 37, it is only necessary to mount the counterweight structure on the crankshaft 38 and then insert a bolt 39 through one of the wrist pin holes 40 and through one of the radial slots 36. A small block 41 that fits within the radial slots and has a surface which bears against the inner face of the crank arm 37 is provided to maintain the counterweight structure in proper spaced relation to the crank arm.

It will be apparent that the weight center of the counterweight structure 35 may be adjusted to a multiplicity of positions with respect to the crank arm 37 by laterally swinging the counterweight structure and the crank arm relative to each other until the wrist pin holes 40 in the crank arm are complemental to the desired radial slot 36 in the counterweight structure. Also, it will be understood that a plurality of bolts 39 may be used to operatively connect the counterweight structure with the crank arm and that the radial slots 36 are of such nature that the counterweight structure may be adjusted radially with respect to the hub of the crank arm 37.

Figure 10:
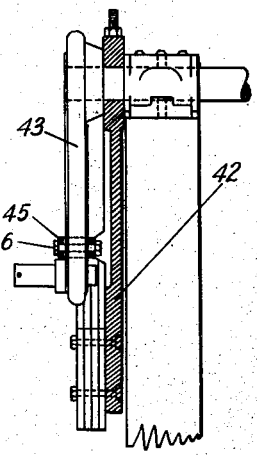
Figure 10 is a side view, partly in section, of the device shown in Figure 9.

In Figures 9 and 10, we have shown still another modification of our invention which is an exact duplicate in construction to the device shown in Figures 7 and 8, with the exception of the means provided for operatively connecting the counterweight structure and the crank arm. As shown in these figures, a counterweight structure 42 is mounted on the crankshaft.

Figure 11:
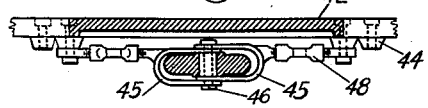
Figure 11 is a sectional view taken on the line 7—7 of Figure 9.

The counterweight structure 42 and the crank arm 43 are operatively connected together by means of U-shaped clevices 45 which are attached to the crank arm 43 by means of a bolt 46 which extends through one of the wrist pin holes of the crank arm and through the ends of the clevices 45, as shown in Figure 11. Each U-shaped clevice forms a part of a connecting link 47, which connecting link is attached at one end thereof to one of a plurality of tapered bosses 44 that are disposed in an arcuate path on the face of the counterbalance. Turnbuckles 48 are provided in each of the connecting links so that the connecting links may be lengthened or shortened as desired. By varying the point of connection between the connecting link and the counterweight and by adjusting the respective turnbuckles 48, the center of weight of the counterweight structure may be adjusted to a plurality of positions with respect to the crank arm. It will be apparent that this counterweight structure may be attached to any standard make of crank.

Figure 12:
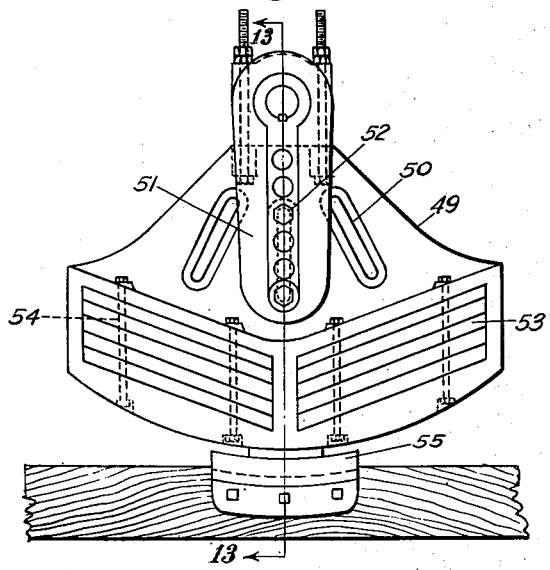
Figure 12 is a front elevation of still another modified form of our invention.
Figure 13:
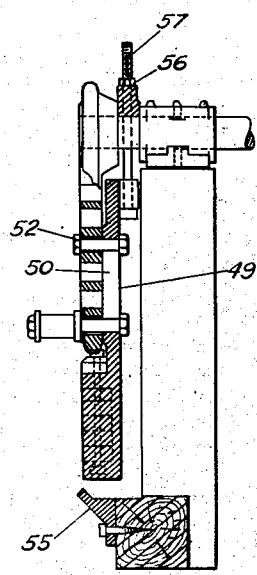
Figure 13 is a side view, partly in section, of the device shown in Figure 12.

In Figures 12 and 13, we have shown another modified form of our invention which consists of a counterweight structure 49 that is of substantially the same construction as the counterweight structure shown in Figures 3 and 4. This counterweight structure is mounted on the crankshaft of an oil well drilling or pumping mechanism as shown in Figure 13 and is provided with a plurality of radial slots 50. The counterweight structure 49 may be attached to the crank arm 51 by inserting bolts 52 and the wrist pin through the wrist pin holes of the crank arm, both being then passed through one of the radial slots 50. In these figures, we have shown a counterweight structure into which supplemental weight elements 53 may be inserted to vary the mass of weight of the counterweight structure and have provided bolts 54 that are adapted to extend upwardly through the counterweight structure and the supplemental weight element 53 to hold the weight element in position. It will be apparent that this counterweight structure is adapted for use with any standard rig and that the center of weight of the counterweight unit may be adjusted to a multiplicity of positions with respect to the crank arm by varying the slot 50 through which the bolts 52 extend.

Referring to the drawings, it will be seen that we have provided a means whereby the counterweight structure may be detached from the crankshaft or crank hub on which it is mounted and such crankshaft or crank hub relieved of the weight thereof. Further, we have provided a means for maintaining the counterweight structure in such position with relation to the crank hub and crankshaft that it may be quickly and easily remounted on the crank hub or crankshaft after it has once been detached therefrom.

In order to provide a means whereby this may be accomplished, a shelf 55 or other supporting structure is provided immediately below the counterweight structure. This bracket is intended to receive and support the counterweight structure when the nuts 56 on the bolts 57, which are made of extra length for this purpose, are sufficiently loosened to permit the counterweight structure to be practically entirely disconnected from the crank hub or crankshaft. At the same time, the counterweight structure is maintained in such position that it may be quickly and easily remounted on the crank hub or crankshaft by the simple expedient of tightening the nuts on the bolts 57 to such an extent as to draw the counterweight structure upwardly to its operative position.

From the foregoing description and the drawings, it will be clearly seen that we have provided a counterweight structure which may be attached to any standard make of crank and which is adjustable to permit any desired counterbalancing effect to be obtained. The desired counterbalancing effect may be obtained in several ways, the most simple of which is by adjusting the counterweight structure and the crank arm laterally with relation to each other until the center of weight of the counterweight structure is in the desired position with relation to such crank arm. Another means of obtaining the desired counterbalancing effect is to vary the number of supplemental weight elements on the counterbalance unit. Still another means is by adjusting the pitman of the drilling and pumping mechanism to various positions along the crank arm by varying the position of the wrist pin on the crank arm. From the above it is apparent that our counterweight structure may be quickly and easily shifted with relation to the crank arm to synchronize the counterbalance effect with the load.

It will also be apparent that by providing the counterweight structure which is so designed as to be attached to any standard make of crank, we have provided an economical and effective means for counterbalancing the movements of various parts of oil well drilling and pumping mechanism that has decided advantages over a band wheel or walking beam counterbalance. One of these advantages resides in the fact that the crank may be assembled with the crankshaft in the factory. By assembling the crank and crankshaft in the factory, it is possible to do so in ways which will ensure a more rigid fit between the crank and crankshaft than may be obtained when they are assembled in the field.

Another advantage resides in the fact that the strain on the band wheel and the torsional stress on the crankshaft, as produced by band wheel and walking beam counterbalances, are eliminated. In our device, we have connected the weight directly to the crankshaft, which practically eliminates any stress on the band wheel, keys, crankshaft and associated parts.

A further advantage resides in the fact that our counterweight is so constructed, and attached to the crank arm in such a manner that the counterweight is at a maximum distance from the center of the crankshaft. Obviously, the further the counterweight is removed from the crankshaft the less weight is required. Our device will permit a relatively small counterweight to be used to obtain a relatively large counterbalancing effect.

Having thus described our invention, what we claim is:

1. An attachment for the crank arm of an oil well drilling or pumping mechanism comprising a weight structure suspended from said crank arm, means for operatively connecting said crank arm and said weight structure by moving said weight structure along the longitudinal axis of said crank arm and a bolt extending through said crank arm and said weight structure.

2. An attachment for the crank arm of a pumping mechanism comprising a weight structure designed to be so mounted upon the crank of the pumping mechanism that its weight will be added to the crank in such a way as to render such weight effective to assist in raising the pumping tools and in retarding the falling action of such pumping tools, means on said structure for embracing the outer end of said crank arm, and means for drawing said last named means into firm contact with the outer end of said crank arm, said drawing means being of such a structure that said weight may be moved into such position that it will not interfere with the rotation of said crank.

3. An attachment for the crank arm of a pumping mechanism comprising a weight structure designed to be so mounted upon the crank of a pumping mechanism that its weight will be added to the crank adjacent the outer end thereof so as to render such weight effective to assist in raising the pumping tools and in retarding the falling action of said pumping tools, means whereby said weight structure may be operatively connected to the outer end of said crank arm by moving said weight structure along the longitudinal axis of said crank arm, said means being adjustable to bring about movement of said weight structure to a position of non-interference with said crank.

4. An attachment for the crank arm of pumping mechanism comprising a weight structure designed to be so mounted upon the crank of a pumping mechanism that its weight will be added to the crank in such a way as to render such weight effective to assist in raising the pumping tools and in retarding the falling action of such pumping tools, means for embracing and gripping the outer end of said crank arm, and bolts on opposite sides of said weight structure for drawing said last named means into effective position with relation to said crank arm, said bolt structure being adjustable to permit said weight structure to be moved into such position that it will not interfere with rotation of said crank.

5. A counterbalance for attachment to the crank of a pumping mechanism comprising a weight structure, means for securing said weight structure to said crank, said means being adjustable to permit movement of said weight structure along the longitudinal axis of said crank arm, said weight structure and said securing means being of such form that the weight structure may be moved longitudinally of said crank arm to a position of non-interference with the movement of said crank arm in its rotary path.

6. An attachment for the crank arm of a pumping mechanism comprising a weight structure designed to be so mounted upon the crank of a pumping mechanism that its weight will be added to the crank on that side of the center of the crankshaft from which the crank extends so as to render such weight effective to assist in raising the pumping tools and in retarding the falling action of said pumping tools, means whereby said weight structure may be operatively connected to the outer end of said crank arm by moving said weight structure along the longitudinal axis of said crank arm, said means being adjustable to bring about movement of said weight structure to a position of non-interference with said crank.

7. An attachment for the crankshaft of well pumping mechanism comprising a crank arm, a weight structure suspended from the hub of said crank arm, means carried by said crankshaft for moving the weight center of said weight structure toward and away from said hub, and means for detachably securing said crank arm to said weight structure.

8. In a well pumping mechanism, a crankshaft, a crank arm mounted on said crankshaft, a counterbalance weight structure, means for suspending said counterbalance weight structure from said crankshaft and in juxtaposition to said crank arm, said suspending means being adjustable to raise said counterbalance weight structure or to lower it relative to said crank arm, and means other than said weight suspending means for attaching said weight structure directly to said crank arm when said crank arm and said weight are in proper relation to each other.

RICHARD R. BLOSS.
ROY C. PFEIL.